Jan. 30, 1968     H. B. OSBORN, JR     3,366,768
APPARATUS AND METHOD OF WELDING METAL STRIP
Filed Jan. 19, 1966     2 Sheets-Sheet 1
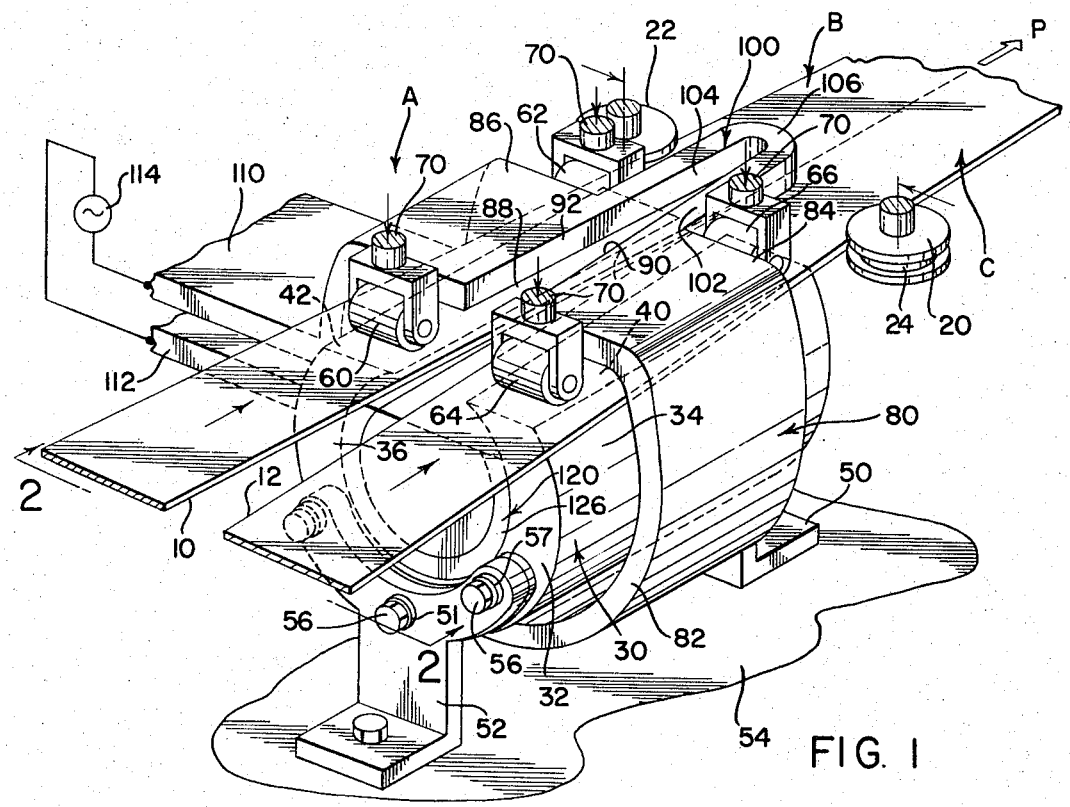
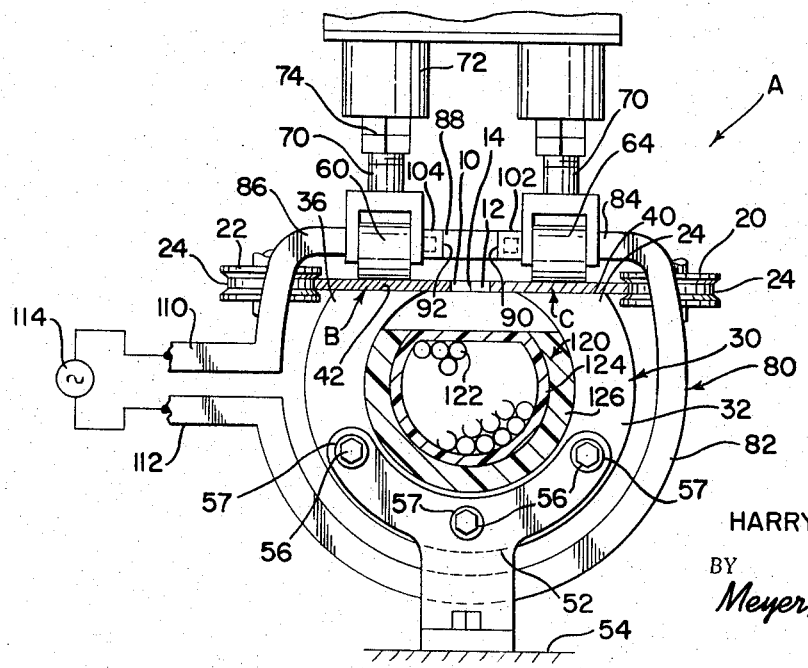
INVENTOR.
HARRY B. OSBORN, JR.
BY
Meyer, Tilberry & Body
ATTORNEYS Jan. 30, 1968  H. B. OSBORN, JR  3,366,768
APPARATUS AND METHOD OF WELDING METAL STRIP
Filed Jan. 19, 1966  2 Sheets-Sheet 2

INVENTOR.
HARRY B. OSBORN, JR.
BY
*Meyer, Tilberry & Body*
ATTORNEYS

United States Patent Office 3,366,768
Patented Jan. 30, 1968

3,366,768
APPARATUS AND METHOD OF WELDING METAL STRIP
Harry B. Osborn, Jr., Pepper Pike, Ohio, assignor to The Ohio Crankshaft Company, Cleveland, Ohio, a corporation of Ohio
Filed Jan. 19, 1966, Ser. No. 521,669
13 Claims. (Cl. 219—9.5)

This invention pertains to the art of induction heating and more particularly to an apparatus and method of inductively heating metal strip preparatory to pressure welding thereof.

The present invention is particularly applicable to welding generally flat metal strips in edge-to-edge, coplanar relationship and it will be described with particular reference thereto; however, it will be appreciated that the invention has much broader applications and may be used to weld two metal strips along various surfaces.

In the production of many articles, it is necessary to weld two metal strips in edge-to-edge relationship. For instance, in making some band saw blades a composite strip is formed by welding a high carbon steel strip in edge-to-edge relationship with a low carbon steel strip. Heretofore, this process has been accomplished by arc welding the dissimilar strips together and then grinding off the excess metal adjacent the seam between the strips. Of course, this type of process must be performed at a relatively slow rate. In addition, this process is quite costly when performed in a manner which will produce a quality welded seam. There are many other instances where two metal strips, formed from similar or dissimilar metals, must be welded together in edge-to-edge relationship to produce a composite strip.

These and other disadvantages of prior methods for welding metal strips in edge-to-edge relationship are overcome by the present invention which is directed toward a method and apparatus for welding two strips together in edge-to-edge relationship by using an induction heating principle hereinafter described in detail.

In accordance with the present invention, there is provided an induction heating apparatus for welding two metal strips along mutually facing surfaces. The apparatus comprises means for moving the strip along a given path with the surfaces spaced slightly, means for forcing the facing surfaces together at a given point whereby the surfaces converge at this point, an electrically conductive member having a generally U-shaped cross-section with two outwardly facing surfaces, the outwardly facing surfaces extending generally along the path, means for supporting the member in the vicinity of the point, means for forcing each of the strips against one of the member surfaces and in sliding contact therewith, and an energizable inductor surrounding and closely spaced from the member and the strip.

The above described apparatus welds the two metal strips together by inducing voltage differentials within the conductive member and the strips, and these voltage differentials cause heating currents to flow around the conductive member, along the converging surfaces of the strips and across the point. These currents raise the surfaces to the welding temperature so that they are pressure welded together adjacent the point of convergence. When high frequency is used for energizing the inductor, the proximity effect concentrates the current along the converging surfaces and across the point of convergence to further enhance the heating of the strip surfaces before they are actually pressure welded together.

In accordance with another aspect of the present invention, there is provided a method of welding two metal strips along mutually facing surfaces. This method comprises the following steps: moving the strip along a given path with the surfaces spaced slightly, forcing the facing surfaces together at a given point so that the surfaces converge at this point, forming a generally stationary conductive path between the moving strips at a position where the surfaces are converging, inducing voltage potentials simultaneously in said stationary conductive path and in said strips moving thereby so that induced heating currents flow around said conductive path, along said converging edges and across said point to heat the surfaces of the strip to the welding temperature, and exerting a welding pressure between the surfaces adjacent the converging point to weld the strips together.

The primary object of the present invention is the provision of an apparatus and method of welding two strips together by first inductively heating the strips and then pressure welding the edges together.

Another object of the present invention is the provision of a method and apparatus of welding two strips together which method and apparatus use induction heating principles and prevent detrimental surface damage to the strips being welded.

Another object of the present invention is the provision of an apparatus and method of welding two strips together which method and apparatus use induction heating principles and perform the welding process at a rate heretofore difficult to obtain.

These and other objects and advantages will become apparent from the following description used to illustrate the preferred embodiment of the invention as read in connection with the accompanying drawings in which:

FIGURE 1 is a pictorial view showing, somewhat schematically, the preferred embodiment of the present invention;

FIGURE 2 is an end view taken generally along line 2—2 of FIGURE 1;

Figure 3:
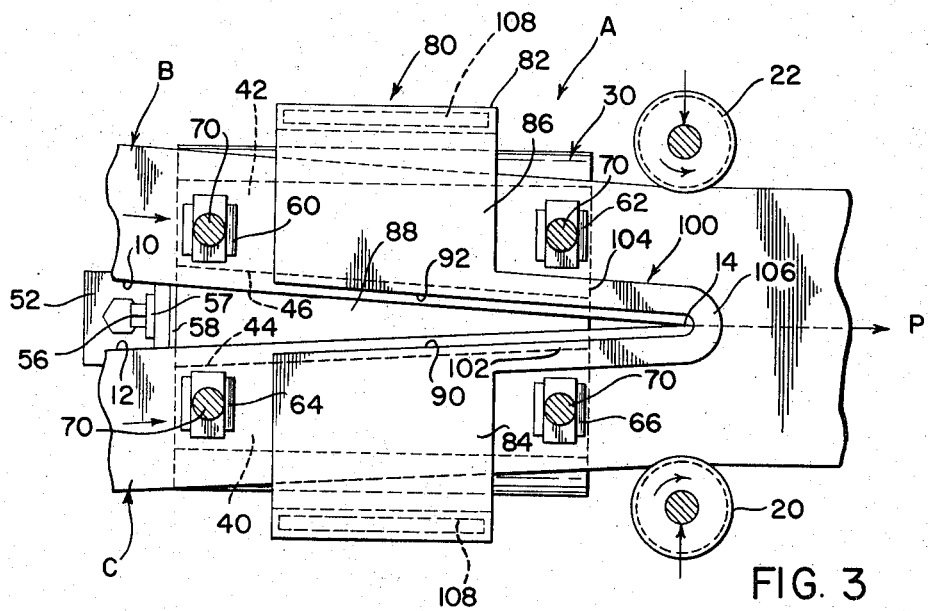
FIGURE 3 is a top view of the preferred embodiment shown in FIGURE 1.
Figure 4:
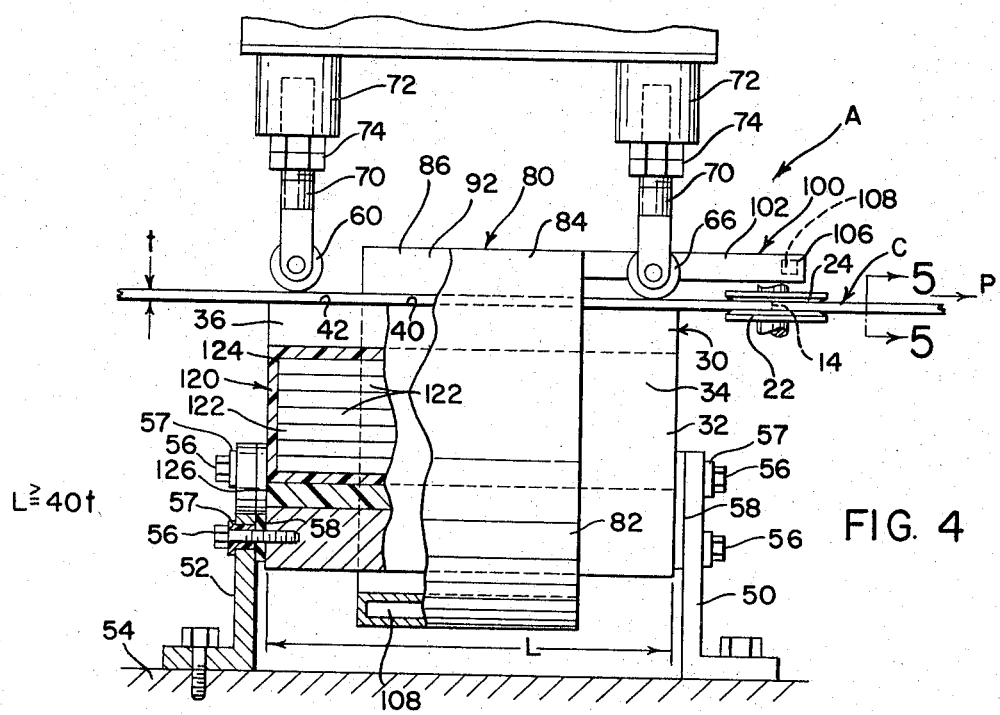
FIGURE 4 is a cross-sectional side view showing the preferred embodiment of the present invention.

Referring now to the drawings wherein the showings are for the purpose of illustrating a preferred embodiment of the invention only and not for the purpose of limiting same, the figures show an induction heating apparatus A for welding the facing edges 10, 12 of metal strips B, C, respectively, as the strips move along a given path P. The edges 10, 12 converge at a point 14 best shown in FIGURE 3, and welding of the edges is effected in the general vicinity of point 14. The strips B, C are formed of dissimilar material, such as high carbon and low carbon steels used in forming composite band saw blades. A feeding mechanism, not shown, moves the strips along the path P which extends through apparatus A. The edges 10, 12 are forced into engagement at point 14 by transversely spaced pressure rolls 20, 22 having peripheral grooves 24 so that a firm transverse force may be exerted against the two metal strips in a manner shown in the drawings.

In the past, the dissimilar strips were welded together by an arc welding method which was relatively slow and required substantial subsequent operations to produce a usable composite strip. The present invention overcomes this disadvantage and includes, as an essential feature, an electrically conductive member 30 having a generally U-shaped cross-section. Of course, this U-shaped cross-section may be varied between a generally rectangular shape or a generally C-shape, as shown in the figures. Member 30 is formed from a conductive metal which has certain wear characteristics. The best electrical characteristics can be obtained by a cupreous base metal. On the other hand, the best wear characteristics can be obtained by using a ferrous metal. Consequently, both cupreous base metals and ferrous base metals are anticipated for use in the present invention. The preferred embodiment of the invention utilizes a bronze, such as Ampco bronze, which is widely used in producing sliding contacts for resistance heating equipment and brushes for dynamo-electric apparatus. The U-shaped member 30 has a large bulk body 32 to accommodate large current flows. This body terminates in outwardly extending legs 34, 36 having outwardly facing wear surfaces 40, 42.

The member 30 may be produced in various manners; however, as illustrated, this member is produced from a heavy walled cylinder. An axial slot is cut into the cylinder to define converging edges 44, 46, best shown in FIGURE 3. These edges generally match the converging edges 10, 12 of strips B, C. Thereafter, the surfaces 40, 42 are provided by grinding the slot area of the member 30 in a plane parallel to the axis of the member and generally perpendicular to the center of the slot within the member. Consequently, the surfaces 40, 42 are trapezoidal in shape and extend in a direction generally parallel with path P. Of course, the member 30 could be produced by other procedures as long as the member includes a heavy body portion terminating in legs having outwardly facing wear surfaces. The dimensions of these wear surfaces will be hereinafter described in some detail since the dimensions form a more limited aspect of the present invention.

The member 30 is supported opposite one side of moving strips B, C by brackets 50, 52 secured by appropriate means onto a fixed base 54. Bolts 56 hold the member 30 onto the support brackets 50, 52, and insulator sleeves 57 and plates 58 electrically isolate the member 30 from these brackets. A mechanism is provided for forcing the flat surfaces of the moving strip against the wear surfaces 40, 42. A variety of mechanisms could be used; however, in accordance with the illustrated embodiment of the present invention, pressure rollers 60, 62, 64 and 66, supported by rods 70 exert relatively high forces which hold the strips against the wear surfaces 40, 42. Rods 70 are threaded to receive nuts 74. Rotation of the nuts moves the rollers downwardly into tight contact with the exposed surfaces of the strips. It is appreciated that biasing springs or fluid operators could be provided for maintaining a force between the rollers and the strips. Other structural arrangements could be provided for maintaining the strips in sliding contact with the wear surfaces.

An inductor 80 completely surrounds both member 30 and the strips B, C. This inductor includes a C-shaped body 82 having arms 84, 86 directly overlying the moving strips B, C. In the illustrated embodiment of the invention, the inductor 80 is provided with a slot 88 directly above the slot in member 30. Slot 88 is defined by converging edges 90, 92 generally matching the converging edges 10, 12 of the moving strips. Electrical continuity across edges 90, 92 of slot 88 is provided by a nose 100 protruding outwardly along path P from the arms 84, 86. This nose includes converging legs 92, 94 generally matching edges 10, 12 and an apex 106 generally overlying the converging point 14. The inductor is cooled by the use of a conventional coolant passage 108 extending through the inductor and its nose. Outwardly extending leads 110, 112 are connected across the output terminals of a high frequency power source, schematically represented as a generator 114. The frequency of the generator output may be varied; however, it is preferred that the output frequency be within the range of 1–20 kilocycles. In practice, the frequency is approximately 10 kilocycles. In certain instances, it may be necessary to deviate slightly from the preferred range of 1–20 kilocycles.

Within the member 30 there is provided an impedor 120 which functions in a known manner to control the current flow paths through the member 30 in the strips B, C. The impedor may assume a variety of structural embodiments; however, in the illustrated embodiment of the invention, ferrite rods 122 are secured within an insulating casing 124 which is supported within the member by material 126. This material may be adhesively held to the member 30 to prevent inadvertent displacement of the impedor with respect to the member.

Figure 5:
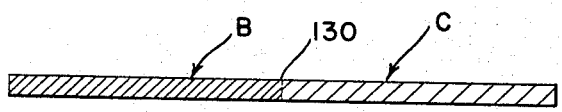
FIGURE 5 is an enlarged cross-sectional view taken generally along line 5—5 of FIGURE 4.

In operation, the generator 114 causes high frequency current flow through the inductor 80. This inductor acts generally in the same manner as an inductor used in a tube mill. The high frequency flowing through the inductor induces voltage potentials or voltage differentials within both the member 30 and the moving strips. This causes current flow around the member, along converging or facing edges 10, 12 and across the point 14. Because high frequency is used, the proximity effect crowds the current flow along the converging edges. This efficiently raises the temperature of these edges to a welding temperature so that the pressure rolls 20, 22 can exert a welding pressure between edges 10, 12. This produces a seam 130, as shown in FIGURE 5. This seam provides a sound joint between the dissimilar moving metal strips so that they become a somewhat integral strip for subsequent manufacturing uses. Essentially, the member 30 converts the moving strips into an electrical entity somewhat similar to the moving skelp of a tube mill. Consequently, the standard tube mill type of inductor 80 may be used for the heating operation to obtain the basic benefits heretofore realized in induction heating apparatus for forming metal tubes.

The axial length of surfaces 40, 42 is sufficient to provide an electrical entity similar to the workpiece used in a tube mill. It has been found that this function can be accomplished by providing the surfaces 40, 42 with a length L for a given strip thickness $t$. The length L must be at least 40 times the thickness $t$, and in practice the length L is at least 50 times the thickness $t$. In this manner, the current flow from the member 30 to the strips B, C is distributed over a substantially large area so that no arcing occurs between the member and the strips. In addition, the member 30 extends outwardly beyond each side of the inductor body 80 so that current flow at the terminal ends of the surfaces 40, 42 is relatively slight. This again inhibits arcing between the moving strips and the conductive member 30. By using the dimensions above described, strips having a thickness of approximately 0.060 inch would require a member having at least a length of 2.4 inches, and preferably a length substantially greater than 3.0 inches. In practice, strips having a thickness of 0.060 inch would utilize a member 30 having a length of 4.0 inches with the inductor body having a width of approximately 2.0 inches. Various other modifications of the dimensions can be made as long as the surfaces 40, 42 are sufficiently great in area to prevent arcing between the strips and the wear surfaces against which the strips are forced.

Although the strips are preferably directed toward apparatus A in a coplanar relationship, it is conceivable that one strip could be brought into the apparatus from a vertically different level so that the converging edges 10, 12 converge in a vertical direction toward point 14. This would require substantially more complicated pressure devices for controlling the actual welding. In addition, the surfaces 40, 42 would be angularly disposed with respect to each other. It is also within the contemplation of the invention, to provide different thicknesses for the surfaces 40, 42. The difference in thickness could be required when the electrical characteristics of the strips B, C, are substantially different or when the width of the strips is somewhat different. All of these modifications are well within the skill of an artisan in the induction heating art upon consideration of this disclosure.

The present invention has been described in connection with a single structural embodiment; however, this embodiment may be varied without departing from the intended spirit and scope of the present invention as defined in the appended claims.

Having thus described my invention, I claim:

1. An induction heating apparatus for welding two generally flat metal strips in edge-to-edge, coplanar relationship, said apparatus comprising: means for moving said strips along a given path with the facing edges of said strip being slightly spaced, pressure means for forcing said facing edges together transversely at a given point whereby said facing edges converge at said point, an electrically conductive member having a generally U-shaped cross-section with two generally parallel wear surfaces extending along said path with each of said surfaces facing a flat surface of one of said strips, means for supporting said member in the vicinity of said edge converging point, means for forcing each of said strips against one of said wear surfaces and in sliding contact therewith, and an energizable inductor surrounding and closely spaced from said member and said strips.

2. An induction heating apparatus as defined in claim 1 wherein said member is spaced slightly forward of said point of convergence.

3. An induction heating apparatus as defined in claim 1 wherein said inductor has a main body portion which surrounds said member and said strip, said body having a slot longitudinal of said path and a generally U-shaped nose piece forming an electrical connection across said slot, said nose piece extending from said body and having two spaced legs and an apex, with said apex generally over said convergence point.

4. An induction heating apparatus as defined in claim 3 wherein said slot defines two spaced edges, said spaced edges of said member being convergent in a direction toward said convergence point and generally overlying said converging facing edges of said strips.

5. An induction heating apparatus as defined in claim 3 wherein said legs of said nose piece are convergent toward said apex and generally overlying said converging facing edges of said strips.

6. An induction heating apparatus as defined in claim 1 including an impedor supported within said member and between said wear surfaces of said member.

7. An induction heating apparatus as defined in claim 1 wherein said member is formed from a cupric material.

8. An induction heating apparatus as defined in claim 1 wherein said member is formed from a ferrous material.

9. An induction heating apparatus as defined in claim 1 wherein said wear surfaces have a minimum length L in the direction of said path and said strips have a maximum thickness $t$ and L is at least equal to $40t$.

10. An induction heating apparatus as defined in claim 9 wherein L is at least equal to $50t$.

11. An induction heating apparatus for welding two metal strips along facing surfaces, said apparatus comprising: means for moving said strips along a given path with said surfaces spaced slightly, means for forcing facing surfaces together at a given point whereby said surfaces converge at said point, an electrically conductive member having a generally U-shaped cross-section with two outwardly facing surfaces, said outwardly facing surfaces extending generally along said path, means for supporting said member in the vicinity of said point, means for forcing each of said strips against one of said member surfaces and in sliding contact therewith, and an energizable inductor surrounding and closely spaced from said member and said strips.

12. An induction heating apparatus as defined in claim 11 wherein said outwardly facing surfaces have a minimum length L in the direction of said path and said strips have a maximum thickness $t$ and L is at least equal to $40t$.

13. A method of welding two metal strips along facing surfaces, said method comprising the following steps:
(a) moving said strips along a given path with said surfaces spaced slightly;
(b) forcing said facing surfaces together at a given point so that said surfaces converge at said point;
(c) forming a generally stationary conductive path between said moving strips at a position where the surfaces are converging;
(d) inducing voltage potentials simultaneously in said stationary conductive path and in said strips moving thereby so that induced heating currents flow around said path, along said converging edges and across said point to heat the surfaces of said strip to the welding temperature; and
(e) exerting a welding pressure between said surfaces adjacent said converging point to weld said strips together.

References Cited

FOREIGN PATENTS 234,373   5/1925   Great Britain.

RICHARD M. WOOD, *Primary Examiner.*